April 18, 1967 W. ROLLINGER ETAL 3,314,599
VACUUM PUMP APPARATUS
Filed June 22, 1965 2 Sheets-Sheet 2
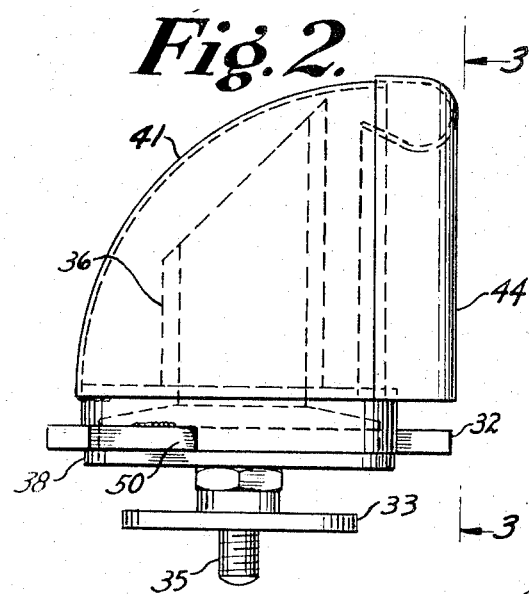
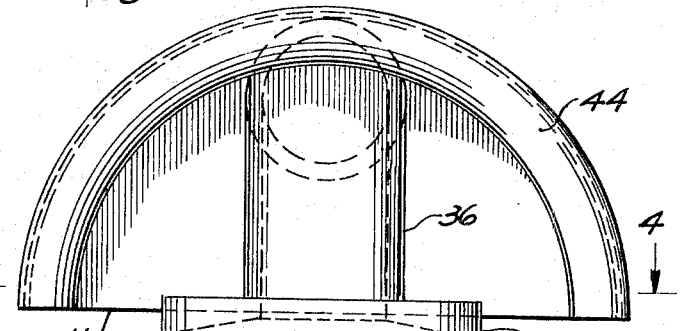
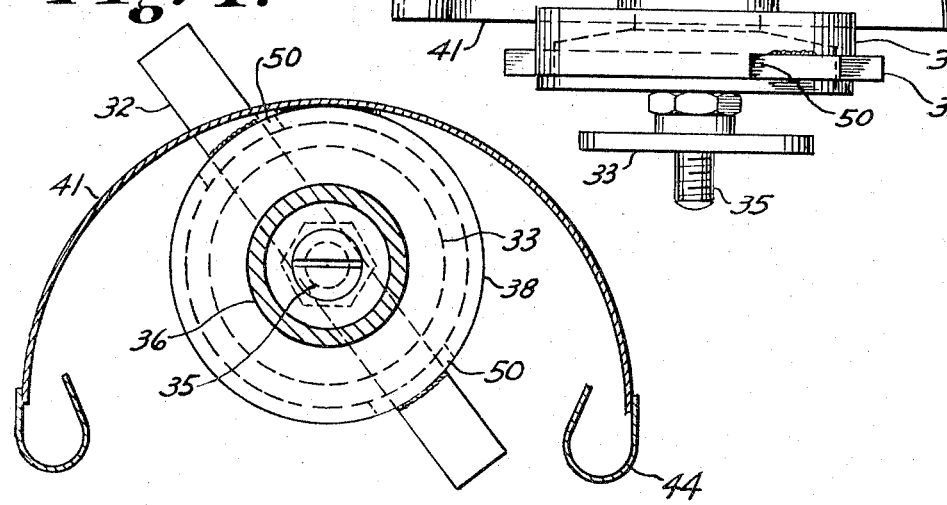
INVENTORS:
Willy Rollinger
Helmut Bode
BY John E. Toupal
ATTORNEY.

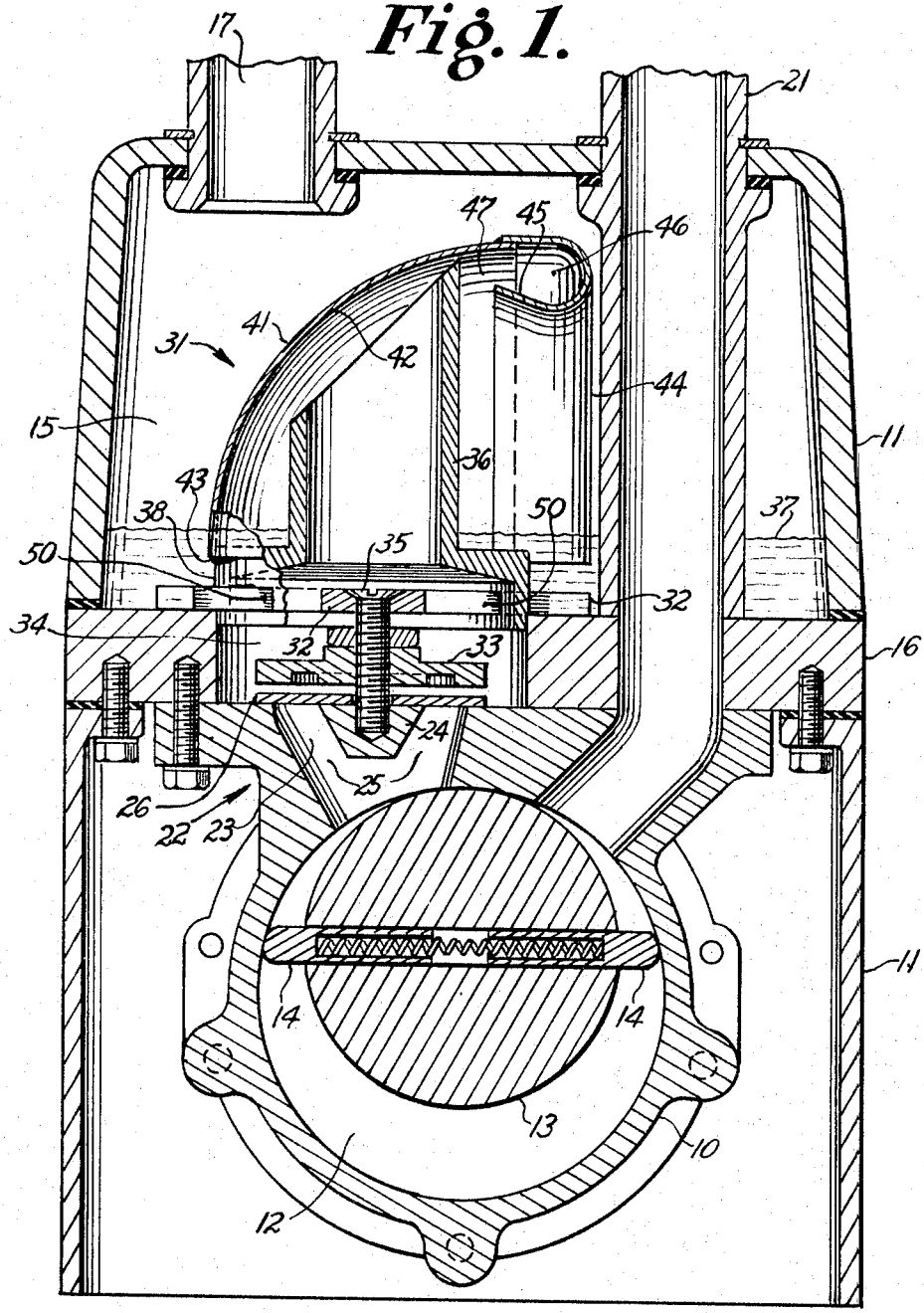

United States Patent Office 3,314,599
Patented Apr. 18, 1967

3,314,599
VACUUM PUMP APPARATUS
Willy Rollinger, Porz-Westhoven, and Helmut Bode, Bergisch-Gladbach, Germany, assignors to Leybold Holding AG, Zug, Switzerland, a Swiss company
Filed June 22, 1965, Ser. No. 466,520
Claims priority application Germany, June 25, 1964, L 48,122
10 Claims. (Cl. 230—153)

This invention relates generally to mechanical vacuum pumps and more particularly to mechanical vacuum pumps which have exhaust valves immersed in a sealing liquid which is typically oil.

During operation these pumps expel relatively large quantities of pumped gas through an exhaust valve superposed by a sealing oil bath. The escaping gas draws along some of the sealing oil in the form of a fine mist. This mixture of oil and gas is then exhausted into the atmosphere resulting in a substantial loss of oil.

Attempts have been made to decrease oil consumption by separating the entrained oil mist from the exhaust gas before expulsion to the atmosphere. The separation typically takes place in an oil separator chamber which communicates with the outlet side of the oil covered exhaust valve. Various types of devices have been utilized in the oil separator chambers to effect the separation of oil and gas. These devices have included deflector plates, baffles, filters, cyclone separators, etc.

The deflector plate is the most common of these and merely provides a surface in the path of the exhausting gas and oil mixture. Upon contact with the deflection surface the gas in the mixture is diverted into a new flow path while a high percentage of the entrained oil mist adheres to the deflection surface.

The deflector plate offers such advantages as simplicity and low cost in addition to producing initially effective separation. However, the final effectiveness of the deflector plate is frequently reduced by a re-combination of the separated oil and pumped gas. This re-combination occurs which droplets of the collected oil subsequently fall from the deflector plate into the diverted path of the escaping gas to become again entrained thereby. Typically, the collected oil droplets fall at an edge of the deflector plate toward which the film of collected oil is being constantly forced by the gas flow.

The object of this invention therefore is to provide a mechanical vacuum pump having a relatively simple, inexpensive and effective apparatus for separating entrained oil particles from the exhausted gas.

One feature of this invention is the provision, in a mechanical vacuum pump having an oil bath immersed exhaust valve, of an oil separator surface positioned in the path of the gas and oil mixture expelled through the exhaust valve and having a re-entrant edge portion projecting toward a portion of the separator surface adapted to deflect the escaping gas.

Another feature of this invention is the provision of a mechanical pump of the above featured type including a nozzle which extends from the exhaust valve above the surface of the oil bath and directs the expelled gas and oil mixture into contact with the separator surface.

Another feature of this invention is the provision of a mechanical vacuum pump of the above featured types wherein the re-entrant edge portion forms a liquid collection channel having an elongated opening adapted to receive the film of collected oil which flows along the separator surface under the influence of the deflected gas.

Another feature of this invention is the provision of a mechanical vacuum pump of the above featured types wherein the liquid collection channel is slanted from a horizontal position to thereby insure that oil collected in the channel will flow under the influence of gravity.

Another feature of this invention is the provision of a mechanical vacuum pump of the above featured types wherein a lower portion of the liquid collection channel is submerged by the oil bath to thereby insure that the oil collected in the channel will flow directly into the oil bath without becoming re-entrained by the deflected gas.

Another feature of this invention is the provision of a mechanical vacuum pump of the above featured types wherein the separator surface is adapted to deflect toward the liquid collection channel substantially all the gas exhausted through the exhaust nozzle to thereby insure migration of collected oil toward the collection channel.

Another feature of this invention is the provision of a mechanical vacuum pump of the above featured types wherein the separator surface is obtuse to the direction or gas flow produced by the nozzle so as to produce laminar flow of deflected gas.

Another feature of this invention is the provision of a mechanical vacuum pump of the above featured type wherein the separator surface has the form of a sphere segment with a horizontal edge submerged in the oil bath and a substantially vertical edge which forms the liquid collection channel.

These and other objects and features of the present invention will become more apparent upon a perusal of the following specification taken in conjunction with the accompanying drawings wherein:

FIG. 1 is an elevational section of a preferred vacuum pump embodiment of the invention, the section being taken through the axis of the exhaust valve assembly;

FIG. 2 is an elevational view of the oil separator shown in FIG. 1;

FIG. 3 is an elevational view of the oil separator shown in FIG. 2 taken along the line 3—3 in the direction of the arrows; and FIG. 4 is a plan view of the oil separator shown in FIG. 3 taken along the line 4—4 in the direction of the arrows.

Referring now to FIGS. 1–4, there is shown the pumping chamber casing 10 mounted within the pump housing 11. The cylindrical impeller 13 is arranged for rotation about an axis eccentric to the pump chamber 12 and for tangential contact with the pump casing 10. Two vanes 14 are slidable in a diametrical slot in the impeller 13 and are urged outwardly from the impeller by a spring in a well known manner. Thus the outer ends of the vanes 14 make a sealing contact as they sweep over the inner surface of the pump casing 10 during rotation of the impeller 13.

The pump housing 11 also defines the separation chamber 15 which is positioned above the pumping chamber 12 and is separated therefrom by the divider plate 16. The outlet aperture 17 in the top wall of the pump housing 11 provides gas communication between atmosphere and the separation chamber 15. The inlet channel 21 extends through the top wall of pump housing 11, the separation chamber 15 and the divider plate 16 so as to provide a gas inlet to the pump chamber 12.

Formed in the pump casing 10 is the valve body 22 having an annular outer portion 23 joined by the transverse center section 24. The valve body 22 forms a pair of semi-annular exhaust channels 25 which provide gas communication between the separation chamber 15 and the pump chamber 12. The centrally apertured valve disc 26 closes the exhaust channels 25 when in contact with the upper surfaces of the valve body 22.

Disposed within the separation chamber 15 is the liquid oil separator 31 supported by the base plate 32 which is mounted on the top surface of the divider plate 16. Also supported by the base plate 32 is the flange 33 which extends through an opening 34 in the divider plate 16 to a position slightly above the valve disc 26. The attachment screw 35 passes through central apertures in the flange 33 and base plate 32 into a threaded engagement with the central portion 24 of the valve body 22. The cylindrical nozzle assembly 36 is mounted on the base plate 32 and extends above the level of the oil bath 37 confined in the separation chamber 15.

Attached to a circular projection 38 on the lower portion of the nozzle 36 is a hoodlike liquid separator plate 41 which has the form of a one-quarter sphere. The concave deflector surface portion 42 of the separator plate 41 encloses the mouth of the nozzle 36 which is cut obliquely to conform to the deflector surface 42. The separator plate 41 includes a horizontal edge 43 submerged in the oil bath 37 and a vertical edge 44 lying mostly above the oil bath 37. The vertical edge 44 includes a re-entrant portion 45 projecting back toward the deflector surface 42 and forming the liquid collection channel 46. The re-entrant portion 45 is slightly spaced from the deflection surface 42 forming a semi-circular opening 47 which is coextensive with the semi-circular liquid collection channel 46.

During operation of the pump the impeller 13 with the associated vanes 14 operate in a well known manner to draw air and other gases through the inlet channel 21 into the pump chamber 12 and to exhaust the pumped air through the exhaust valve 22 to separation chamber 15. As a vane 14 approaches the exhaust channels 25, a positive pressure is built up on the under side of the valve disc 26, which slides upward on the attachment screw 35 until abutting against the under side of the flange 33. Gas is then forced through the divider plate opening 34 which communicates with the oil bath 37 through spaces 50 on each side of the base plate 32 and is accordingly filled with oil. The gas is subsequently directed by the nozzle 36 against the deflector surface 42. As each vane 14 passes, the exhaust channels 25 communicate with a portion of the pump chamber 12 which is under reduced pressure. This produces a limited flow of oil into the pump chamber 12. However, extensive oil flow is prevented by the valve disc 26 which under the influence of gravity and the flowing oil returns to a seating engagement with the valve body 22.

The pumped gas passing through the oil bath 37 draws a substantial quantity of oil along in the form of a fine mist and the mixture is directed by the nozzle 36 against the deflector surface 42. Since the deflector surface 42 is obtuse to the direction of gas flow provided by the nozzle 36 substantially all the exhausting gas is deflected in a laminar flow toward the re-entrant edge portion 45. This deflected gas passes over the bottom side of the liquid collection channel 46 into the separation chamber 15 and is finally exhausted into the atmosphere through the outlet aperture 17.

Upon contact, the oil particles entrained with the gas exhausting through the nozzle 36 adhere to the deflector surface 42 forming a film of oil. This oil film is constantly urged toward the re-entrant edge portion 45 by the force of the gas flow in that direction. Thus the leading edge of the oil film is forced through the semi-circular opening 47 and into the liquid collection channel 46 where it flows under the influence of gravity down the channel 46 into the oil bath 37. Since the ends of the liquid collection channel 46 are submerged, the collected oil returns directly to the oil bath without a drop through free space. For this reason the possibility of collected oil becoming re-entrained with the gases passing over the re-entrant edge portion 45 is eliminated.

Thus the present invention provides a relatively simple and inexpensive mechanical vacuum pump oil separator device which is extremely effective. Furthermore the novel construction of the device prevents any diminution of the initial separation effectiveness by preventing recombination of the collected oil and the exhausted gases.

Although the particular embodiment shown and described is preferred, other configurations can also prove effective. It is therefore to be understood that within the scope of the attached claims the invention can be practiced otherwise than as specifically described.

What is claimed is:
1. A gas pump apparatus comprising:
a pumping chamber and an exhaust channel opening from said chamber; an exhaust valve controlling the flow of gas through said exhaust channel; means for containing a pool of sealing liquid overlying said exhaust valve, whereby gas flowing through said exhaust valve passes through the sealing liquid; a hoodlike liquid separating member positioned adjacent to said exhaust channel to intercept and deflect the gas flowing through said exhaust valve; said hoodlike member defining a bottom opening disposed to lie beneath the surface of the sealing liquid, and a side opening formed by an edge lying in a plane transverse to said bottom opening; and said side opening edge having a re-entrant portion defining a liquid collection channel having an elongated opening adapted to receive a film of sealing fluid intercepted by and migrating along said hoodlike separating member.

2. A gas pump apparatus according to claim 1: wherein said liquid collection channel is coextensive with said side opening edge; and wherein the ends of said channel are disposed to lie beneath the surface of the sealing liquid.

3. A gas pump apparatus according to claim 1: wherein said hoodlike separating member defines a flow path for directing substantially all of the flow from said exhaust valve toward said liquid collection channel.

4. A vacuum pump apparatus comprising a pump housing defining a pumping chamber and a separation chamber, an inlet channel passing through said pump housing into said pumping chamber, an exhaust channel passing between said pumping chamber and said separation chamber, a pumping mechanism disposed within said pumping chamber and adapted upon energization to draw gas into said pumping chamber through said inlet channel and to expel gas from said pumping chamber through said exhaust channel, said separation chamber being adapted to confine a pool of sealing liquid, an exhaust valve means disposed within said exhaust channel so as to have an outlet side superposed by the pool of sealing liquid and adapted to permit the flow of gas from said pumping chamber into said separation chamber, a hoodlike liquid separating member positioned in said separation chamber and having a deflector surface portion adapted to intercept gas exhausted out of said pumping chamber through said exhaust channel and exhaust valve means, said hoodlike member defining a bottom opening disposed to lie beneath the surface of the sealing liquid and a side opening formed by an edge lying in a plane transverse to said bottom opening, said liquid separating surface having a re-entrant edge portion projecting toward said deflector surface portion defining a liquid collection channel having an elongated opening adapted to receive a film of sealing liquid intercepted by and migrating along said deflector surface portion, and an outlet aperture in said pump housing adapted to permit flow of gas out of said separation chamber.

5. A vacuum pump apparatus according to claim 4 wherein said liquid collection channel is coextensive with said side opening edge, and wherein the ends of said channel are disposed to lie beneath the surface of the sealing liquid.

6. A vacuum pump apparatus according to claim 4 wherein said hoodlike separating member defines a flow path for directing substantially all of the flow from said exhaust valve toward said liquid collection channel.

7. A vacuum pump apparatus according to claim 4 wherein said liquid separating surface has substantially the form of the concave portion of a sphere segment with a substantially horizontal edge adapted for submersion in the sealing liquid bath and a substantially vertical edge comprising said liquid collection channel.

8. A vacuum pump apparatus according to claim 4 including a nozzle means projecting from said exhaust channel into said separation chamber and adapted to extend above the level of the sealing liquid pool and to direct exhaust gases against said deflector surface portion.

9. A vacuum pump apparatus according to claim 8 wherein said deflector surface portion provides a surface which lies obtuse to the direction of exhaust gas flow produced by said nozzle means.

10. A vacuum pump apparatus according to claim 8 wherein said nozzle means extends to a point adjacent said deflector surface portion, and wherein said deflector surface portion adjacent to said nozzle means lies obtuse to the direction of exhaust gas flow produced by said nozzle means.

References Cited by the Examiner
UNITED STATES PATENTS

| | | | |
|---|---|---|---|
| 2,158,863 | 5/1939 | Randall | 55—463 |
| 3,053,439 | 9/1962 | Brill | 230—205 |
| 3,151,808 | 10/1964 | Saath | 230—205 |

DONLEY J. STOCKING, *Primary Examiner.*

MARK NEWMAN, WILBUR J. GOODLIN, *Examiners.*

R. M. VARGO, *Assistant Examiner.*